US011697081B2

(12) United States Patent
Lin et al.

(10) Patent No.: US 11,697,081 B2
(45) Date of Patent: Jul. 11, 2023

(54) WATER PURIFIER STRUCTURE

(71) Applicant: Kemflo International Co., Ltd., Pingtung (TW)

(72) Inventors: Ching-Hsiung Lin, Pingtung (TW); Sheng-Nan Lin, Pingtung (TW)

(73) Assignee: Kemflo International Co., Ltd., Pingtung (TW)

( * ) Notice: Subject to any disclaimer, the term of this patent is extended or adjusted under 35 U.S.C. 154(b) by 818 days.

(21) Appl. No.: 16/278,768

(22) Filed: Feb. 19, 2019

(65) Prior Publication Data

US 2020/0261832 A1 Aug. 20, 2020

(51) Int. Cl.
*B01D 35/30* (2006.01)
*C02F 1/00* (2023.01)
(Continued)

(52) U.S. Cl.
CPC .............. *B01D 35/30* (2013.01); *B01D 29/15* (2013.01); *B01D 29/96* (2013.01); *B01D 35/306* (2013.01); *C02F 1/001* (2013.01); *B01D 27/103* (2013.01); *B01D 27/106* (2013.01); *B01D 35/147* (2013.01); *B01D 35/1475* (2013.01);
(Continued)

(58) Field of Classification Search
CPC .......... B01D 2201/34; B01D 2201/345; B01D 35/30; B01D 29/15; B01D 29/96; B01D 35/306; B01D 2201/0461; B01D 2201/303; B01D 2201/304; B01D 2201/305; B01D 2201/31; B01D 2201/342; B01D 2201/4084; B01D 2201/4092; B01D 2271/022; B01D 27/103; B01D 27/106; B01D 35/147; B01D 35/1475; B01D 35/153; B01D 46/0087; B01D 46/0097; B01D 2271/02; C02F 1/001; C02F 1/003; C02F 2201/004; C02F 2201/006; F16L 37/114; F16L 37/1225; B29C 66/52296;
(Continued)

(56) References Cited

U.S. PATENT DOCUMENTS 5,607,192 A * 3/1997 Lee ..................... F16L 37/144
285/305
2014/0263149 A1 * 9/2014 Berge ..................... B67B 3/20
215/44
(Continued)

FOREIGN PATENT DOCUMENTS

WO WO-2018162835 A1 * 9/2018 ............. B01D 29/21

*Primary Examiner* — Akash K Varma
(74) *Attorney, Agent, or Firm* — Alan D. Kamrath; Karin L. Williams; Mayer & Williams PC

(57) ABSTRACT

A water purifier structure includes a container assembly and a buffer unit mounted in the container assembly. The container assembly includes a housing and a cap unit. The housing has a first receiving section and a second receiving section. The second receiving section of the housing is provided with a retaining portion. The buffer unit is mounted in the second receiving section of the housing and includes a positioning ring secured in the retaining portion of the housing, and a cushioning member mounted in the positioning ring. The cushioning member is elastically movable in the positioning ring. When the cushioning member is compressed by a force, the cushioning member is contracted and elastically deformed toward the second receiving section of the housing, to form a buffering force.

12 Claims, 11 Drawing Sheets

(51) Int. Cl.
*B01D 29/15* (2006.01)
*B01D 29/96* (2006.01)
*B29C 65/00* (2006.01)
*B67B 3/20* (2006.01)
*B01D 27/10* (2006.01)
*B01D 35/147* (2006.01)
*B01D 35/153* (2006.01)
*B01D 46/00* (2022.01)

(52) U.S. Cl.
CPC ........ *B01D 35/153* (2013.01); *B01D 46/0087* (2013.01); *B01D 46/0097* (2013.01); *B01D 2201/0461* (2013.01); *B01D 2201/303* (2013.01); *B01D 2201/304* (2013.01); *B01D 2201/305* (2013.01); *B01D 2201/31* (2013.01); *B01D 2201/34* (2013.01); *B01D 2201/342* (2013.01); *B01D 2201/4084* (2013.01); *B01D 2201/4092* (2013.01); *B01D 2271/02* (2013.01); *B01D 2271/022* (2013.01); *B29C 66/52296* (2013.01); *B32B 2581/00* (2013.01); *B67B 3/20* (2013.01); *C02F 1/003* (2013.01); *C02F 2201/004* (2013.01); *C02F 2201/006* (2013.01)

(58) Field of Classification Search
CPC .. B29C 66/52297; B32B 2581/00; B67B 3/20
See application file for complete search history.

(56) References Cited

U.S. PATENT DOCUMENTS

2016/0332095 A1* 11/2016 Abdalla ................ B01D 27/08
2021/0131319 A1* 5/2021 Fayolle ................ B01D 35/153

* cited by examiner

WATER PURIFIER STRUCTURE

BACKGROUND OF THE INVENTION

1. Field of the Invention

The present invention relates to a purifier and, more particularly, to a water purifier structure.

2. Description of the Related Art

A conventional water purifier structure in accordance with the prior art shown in FIG. 11 comprises a container 20 having an interior provided with a receiving chamber 23 and having a top provided with an opening 21, a top cap 10 mounted on the opening 21 of the container 20, and a filtering element A mounted in the receiving chamber 23 of the container 20. The container 20 has a bottom 24 having a flat face. The top of the container 20 has an internal thread 22, and the top cap 10 has an external thread 11 screwed into the internal thread 22 of the container 20. Thus, the filtering element A is located between the top cap 10 and the bottom 24 of the container 20. However, when the filtering element A has a greater length, the top cap 10 and the bottom 24 of the container 20 are pressed by the filtering element A, such that the bottom 24 of the container 20 easily produces a crack B, thereby wearing and decreasing the lifetime of the container 20.

BRIEF SUMMARY OF THE INVENTION

The primary objective of the present invention is to provide a water purifier structure having a buffering effect to receive filter elements with different length.

In accordance with the present invention, there is provided a water purifier structure comprising a container assembly and a buffer unit mounted in the container assembly. The container assembly includes a housing and a cap unit mounted on the housing. The housing has a first connecting portion. The housing has an interior provided with a first receiving section. The housing has a top provided with an opening. The housing has a bottom provided with a second receiving section. The bottom of the housing has an arcuate recessed shape. The second receiving section of the housing is provided with a retaining portion. The cap unit has a second connecting portion detachably connected with the first connecting portion of the housing. The buffer unit is mounted in the second receiving section of the housing. The buffer unit includes a positioning ring secured in the retaining portion of the housing, and a cushioning member elastically mounted in the positioning ring. The cushioning member is elastically movable in the positioning ring upward and downward. When the cushioning member is compressed by an external force, the cushioning member is contracted and elastically deformed toward the second receiving section of the housing, to form a buffering force.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
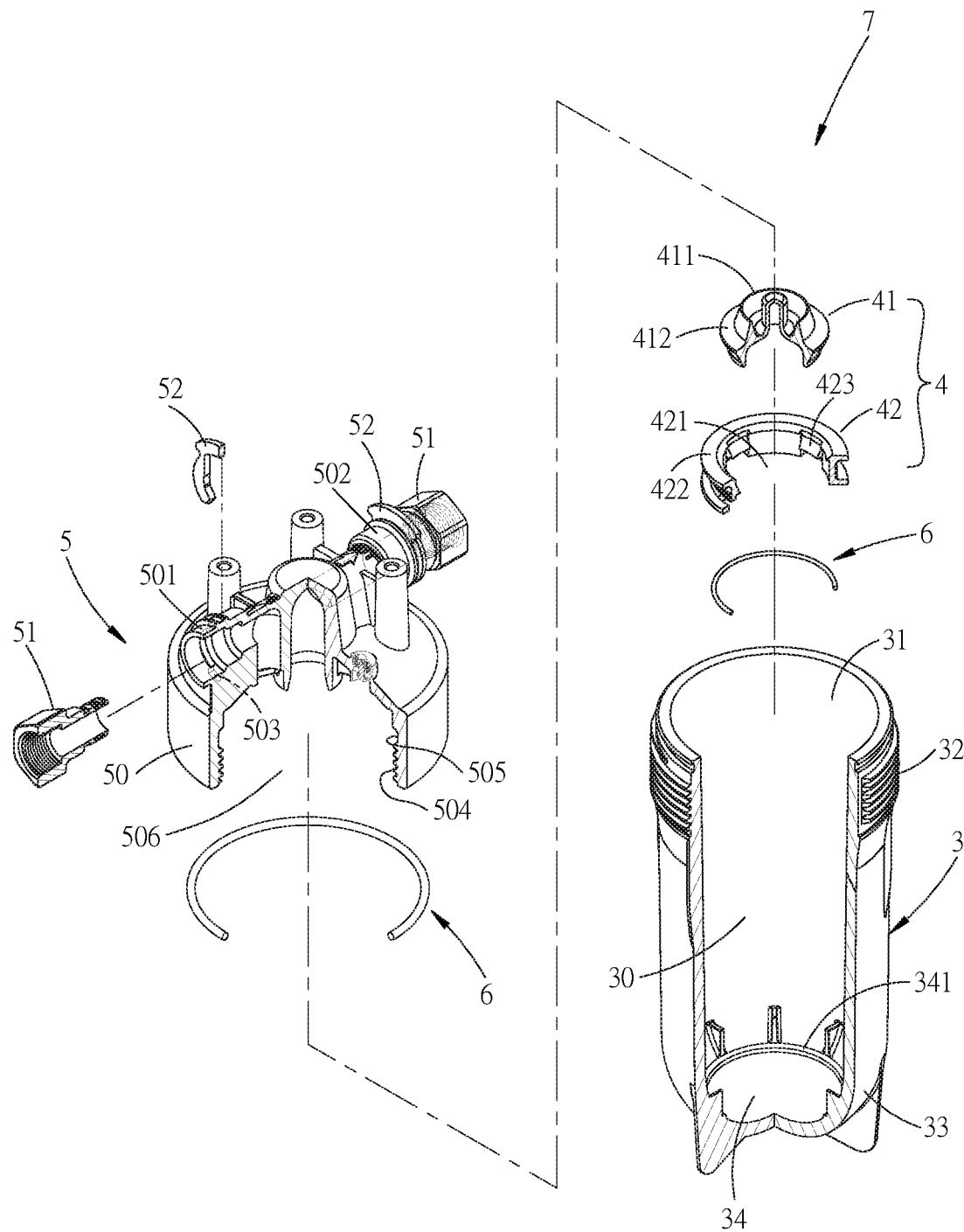
FIG. 1 is an exploded perspective view of a water purifier structure in accordance with the preferred embodiment of the present invention.
Figure 2:
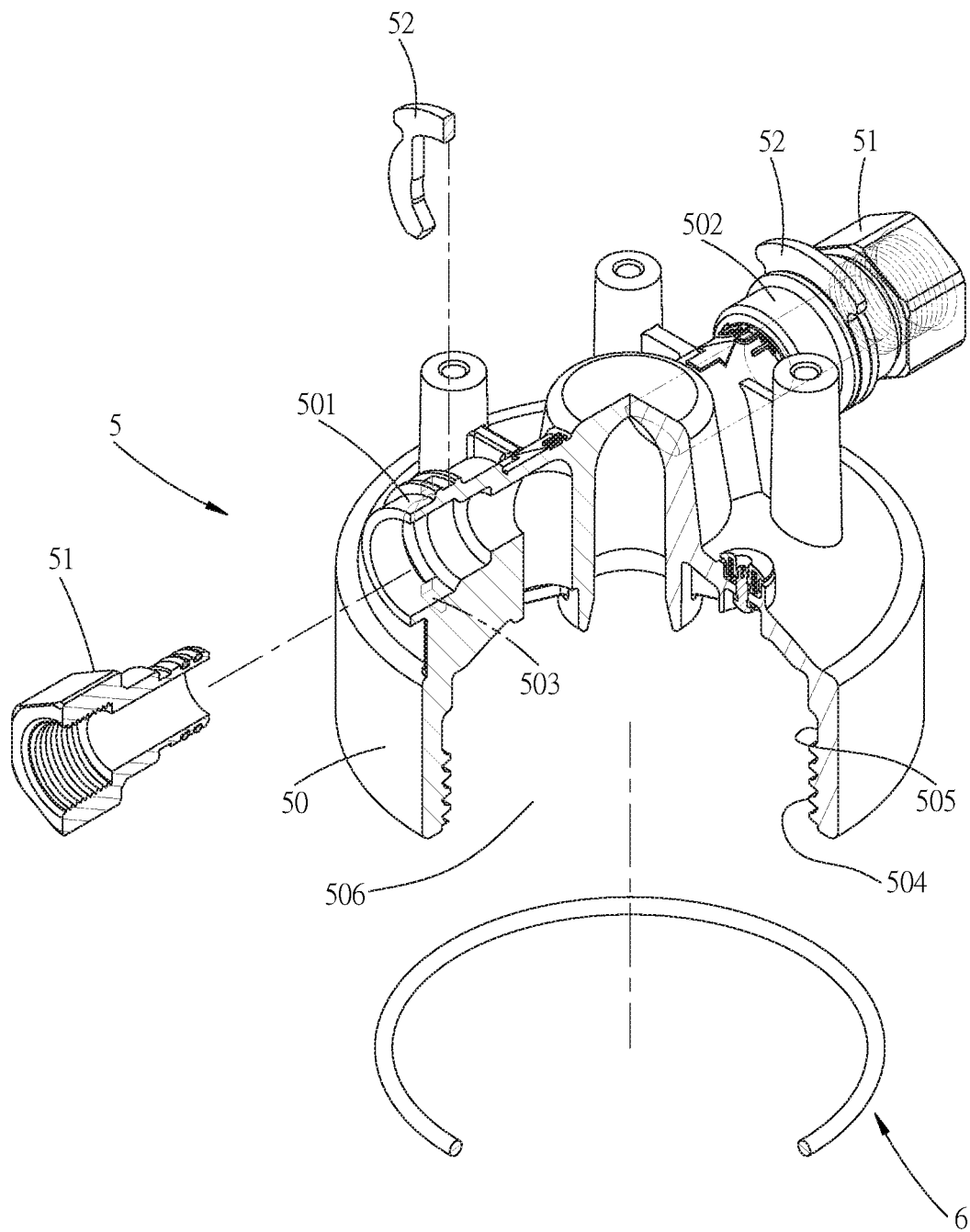
FIG. 2 is an exploded perspective view of a cap unit of the water purifier structure in accordance with the preferred embodiment of the present invention.
Figure 3:
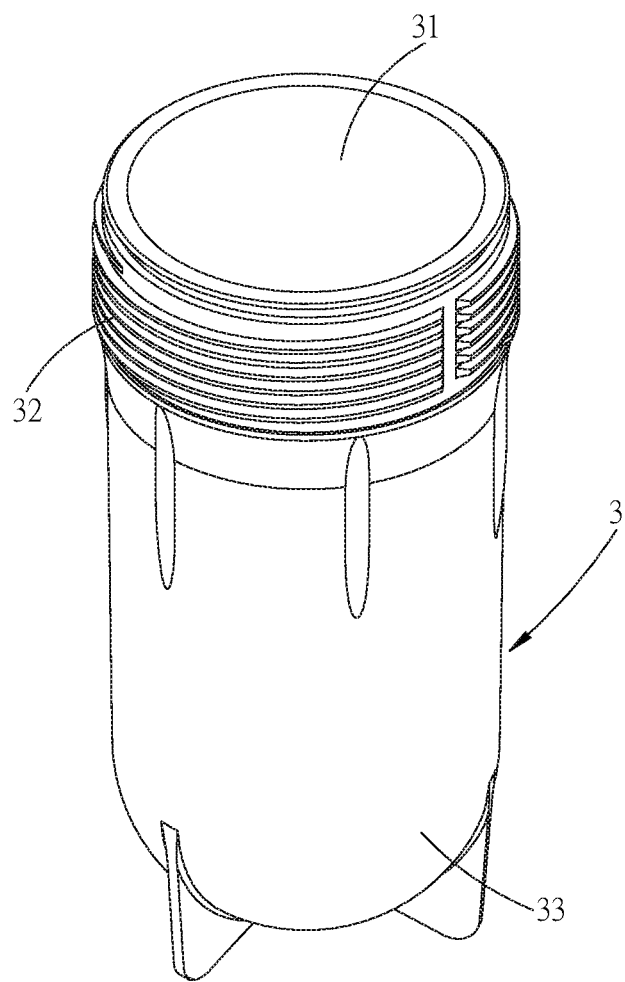
FIG. 3 is a perspective view of a housing of the water purifier structure in accordance with the preferred embodiment of the present invention.
Figure 4:
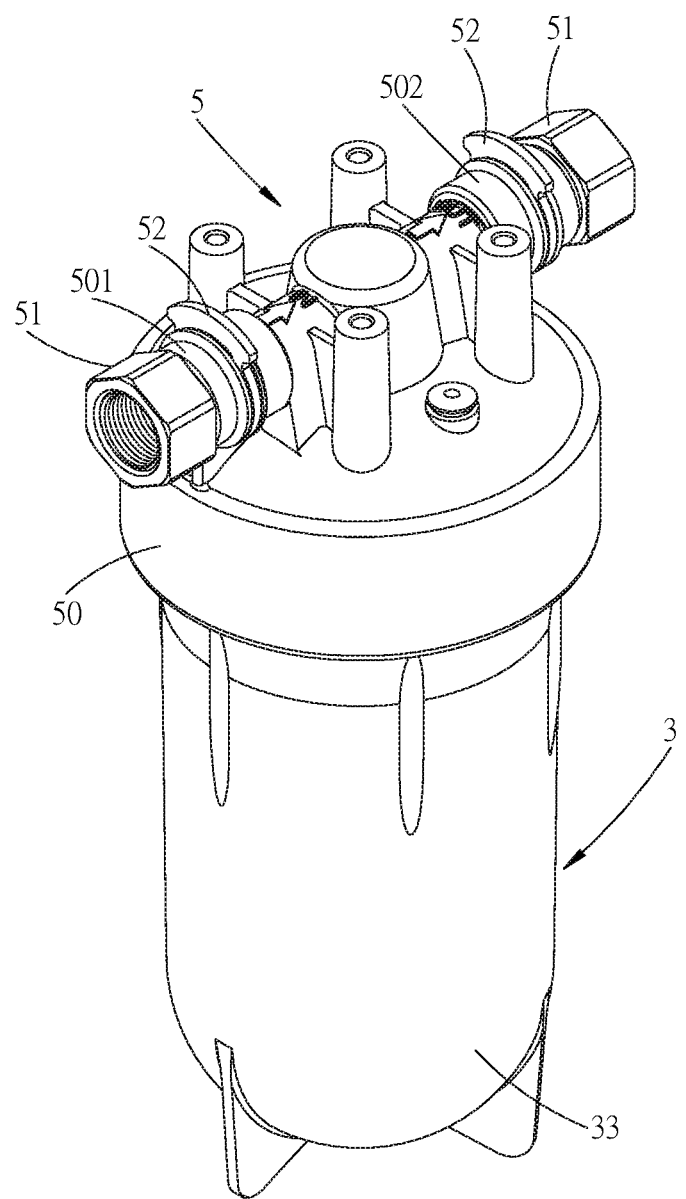
FIG. 4 is a perspective view of the water purifier structure in accordance with the preferred embodiment of the present invention.

Referring to the drawings and initially to FIGS. 1-7, a water purifier structure in accordance with the preferred embodiment of the present invention comprises a container assembly 7 and a buffer (or cushion) unit 4 mounted in the container assembly 7.

The container assembly 7 includes a housing 3 and a cap unit 5 mounted on the housing 3.

The housing 3 has a first connecting portion 32. The housing 3 has an interior provided with a first receiving section 30 for mounting a filter element (or filter or filter cartridge) A. The housing 3 has a top provided with an opening 31 connected to the first receiving section 30. The housing 3 has a bottom 33 provided with a second receiving section 34 connected to the first receiving section 30. The bottom 33 of the housing 3 has an arcuate recessed shape. The second receiving section 34 of the housing 3 is provided with a retaining (or securing or fastening or locking) portion 341.

The cap unit 5 has a second connecting portion 504 detachably connected with the first connecting portion 32 of the housing 3. The cap unit 5 includes a cover 50, two quick connectors 51, and two buckles (or fasteners or latches) 52 each having an inverted U-shape profile. The cover 50 has an interior provided with a chamber 506 which has a periphery provided with an annular groove 505. The chamber 506 has an inverted U-shape profile. The second connecting portion 504 is formed in the chamber 506 of the cover 50. The cover 50 has a top provided with a water inlet port 501 and a water outlet port 502 each having a snap-fit hole 503.

The buffer unit 4 is mounted in the second receiving section 34 of the housing 3. The buffer unit 4 includes a positioning ring 42 secured in the retaining portion 342 of the housing 3, and a cushioning (or pressing or buffering) member 41 elastically mounted in the positioning ring 42.

The cushioning member 41 is made of elastic material and is elastically movable in the positioning ring 42 upward and downward. Thus, when the cushioning member 41 is compressed by an external force, the cushioning member 41 is contracted and elastically deformed toward the second receiving section 34 of the housing 3, to form a buffering (or cushioning) force.

In the preferred embodiment of the present invention, the cushioning member 41 and the positioning ring 42 of the buffer unit 4 are connected detachably. The cushioning member 41 has an upper end provided with a push portion 411 and a lower end provided with a pressing portion 412. The push portion 411 of the cushioning member 41 is provided with a central cavity having an annular shape. The pressing portion 412 of the cushioning member 41 has a conical (or tapered) shape. The positioning ring 42 has an interior provided with a hollow passage 421. The positioning ring 42 has an annular inner face provided with a plurality of elastic plates 423 and has an outer face provided with a snap-fit portion 422 secured on the retaining portion 341 of the housing 3. The snap-fit portion 422 of the positioning ring 42 has a substantially U-shaped cross-sectional profile. The pressing portion 412 of the cushioning member 41 is received in the hollow passage 421 of the positioning ring 42 and is elastically pressed by the elastic plates 423 of the positioning ring 42. The push portion 411 of the cushioning member 41 protrudes outward from a top of the positioning ring 42. Thus, the cushioning member 41 is movable in the hollow passage 421 of the positioning ring 42 and is deformed and flexed elastically due to a compressing force.

In the preferred embodiment of the present invention, the retaining portion 342 of the housing 3 is a groove allowing insertion of the positioning ring 42.

In the preferred embodiment of the present invention, the first connecting portion 32 of the housing 3 is an external thread, and the second connecting portion 504 of the cap unit 5 is an internal thread screwed onto the first connecting portion 32 of the housing 3.

Figure 5:
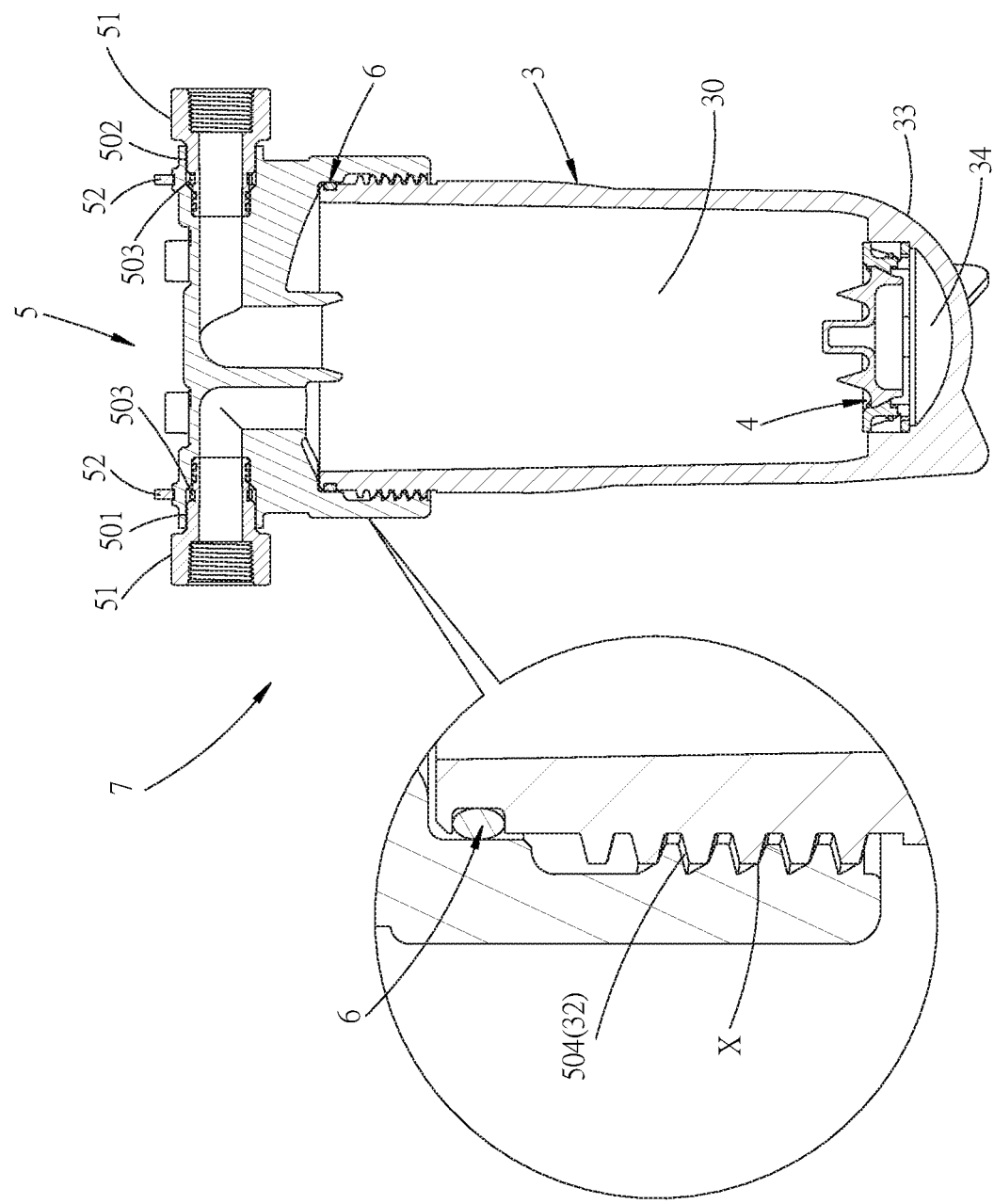
FIG. 5 is a cross-sectional view and a locally enlarged view of the water purifier structure in accordance with the preferred embodiment of the present invention.

As shown in FIG. 5, each of the first connecting portion 32 of the housing 3 and the second connecting portion 504 of the cap unit 5 has a discontinuous double threading X. When the second connecting portion 504 of the cap unit 5 is screwed onto the first connecting portion 32 of the housing 3, the double threading X is kept at a line-to-line contact, such that the first connecting portion 32 of the housing 3 and the second connecting portion 504 of the cap unit 5 are subjected to a force evenly, to enhance a screwing strength, and to prevent the double threading X from being loosened. Preferably, the double threading X has a root portion that is deformed to enhance engagement of the double threading X.

In assembly, one of two O-rings 6 is mounted in the annular groove 505 of the cover 50 to provide an air-tight effect. Then, the other one of two O-rings 6 is mounted in the snap-fit portion 422 of the positioning ring 42. Then, the buffer unit 4 is mounted in the second receiving section 34 of the housing 3 of the container assembly 7, and the positioning ring 42 of the buffer unit 4 is secured in the retaining portion 342 of the housing 3. At this time, the other one of two O-rings 6 is located between the snap-fit portion 422 of the positioning ring 42 and the retaining portion 341 of the housing 3. Then, the two quick connectors 51 are respectively connected with the water inlet port 501 and the water outlet port 502 of the cover 50. Then, the two buckles 52 are snapped into and locked in the snap-fit hole 503 to lock the two quick connectors 51 respectively. Then, the second connecting portion 504 of the cap unit 5 is screwed onto the first connecting portion 32 of the housing 3, such that the cap unit 5 is mounted on the housing 3. Thus, assembly of the water purifier structure is finished.

Figure 6:
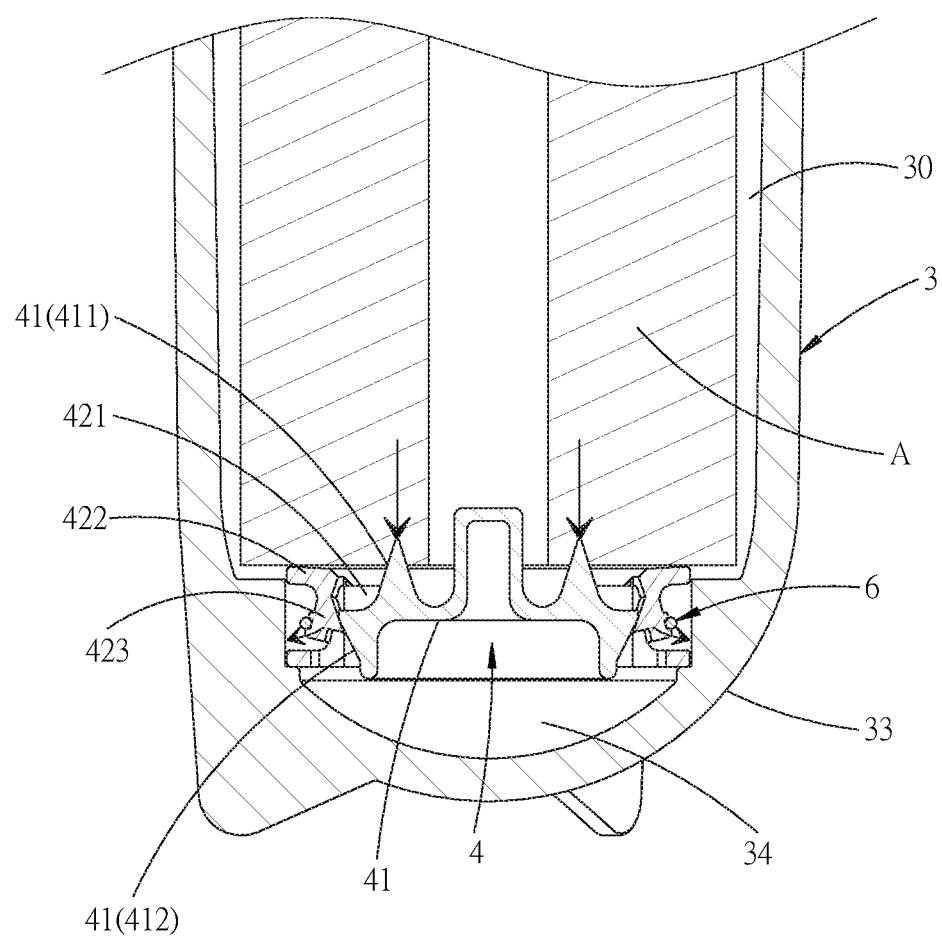
FIG. 6 is a partial cross-sectional operational view of the water purifier structure in accordance with the preferred embodiment of the present invention.

Referring to FIG. 6 with reference to FIGS. 1-5, when the cap unit 5 is removed from the housing 3, the filter element A is inserted through the opening 31 into the first receiving section 30 of the housing 3. Then, the cap unit 5 is mounted on the housing 3 again, such that the filter element A is located between the cap unit 5 and the housing 3. At this time, the bottom of the filter element A rests on the push portion 411 of the cushioning member 41 of the buffer unit 4.

Figure 7:
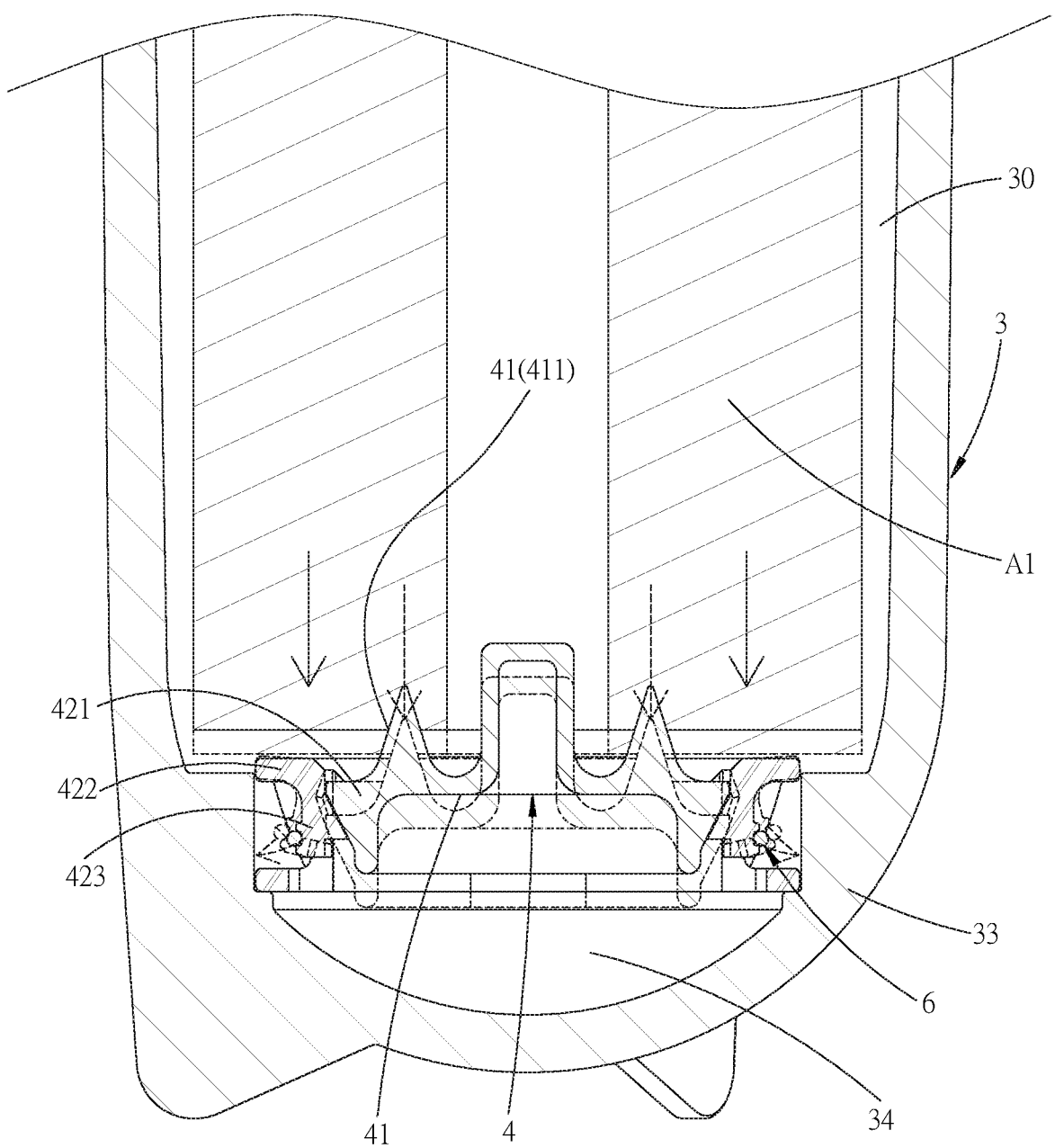
FIG. 7 is another partial cross-sectional operational view of the water purifier structure in accordance with the preferred embodiment of the present invention.

Referring to FIG. 7, when the filter element A has a greater length, the push portion 411 of the cushioning member 41 is pressed by the filter element A. At this time, the positioning ring 42 of the buffer unit 4 is limited by the retaining portion 341 of the housing 3, such that when the push portion 411 of the cushioning member 41 is compressed, the cushioning member 41 of the buffer unit 4 is moved downward relative to the positioning ring 42, and the pressing portion 412 of the cushioning member 41 is moved to press and contract the elastic plates 423 of the positioning ring 42. In such a manner, when the cushioning member 41 is pressed by the filter element A, the cushioning member 41 is contracted and elastically deformed toward the second receiving section 34 of the housing 3, to form a buffering force, such that the filter element A will not directly press the bottom 33 of the housing 3, thereby preventing the bottom 33 of the housing 3 from producing a crack.

Figure 8:
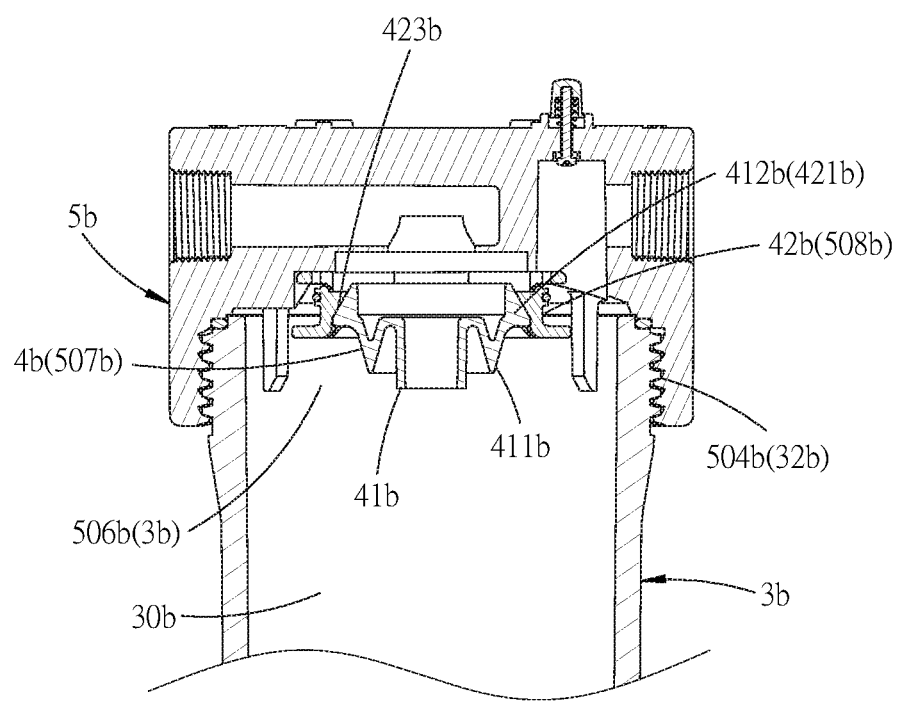
FIG. 8 is a partial cross-sectional view of a water purifier structure in accordance with another preferred embodiment of the present invention.

Referring to FIG. 8, the chamber 506*b* of the cap unit 5*b* is provided with a third receiving section 507*b* connected to the first receiving section 30*b*. The third receiving section 507*b* of the cap unit 5*b* is provided with a retaining (or securing or fastening or locking) portion 508*b*. The buffer unit 4*b* is inserted into the third receiving section 507*b* of the cap unit 5*b*. The second connecting portion 504*b* of the cap unit 5*b* is screwed onto the first connecting portion 32*b* of the housing 3*b*, such that the cap unit 5*b* is mounted on the housing 3*b*. In use, when the filter element has a greater length, the push portion 411*b* of the buffer unit 4*b* is pressed by the filter element. At this time, the positioning ring 42*b* of the buffer unit 4*b* is limited by the retaining portion 508*b* of the third receiving section 507*b* of the cap unit 5*b*, such that when the push portion 411*b* of the buffer unit 4*b* is compressed, the cushioning member 41*b* of the buffer unit 4*b* is moved relative to the positioning ring 42*b*, and the pressing portion 412*b* of the cushioning member 41*b* is moved in the hollow passage 421*b* of the positioning ring 42*b* to press and contract the elastic plates 423*b* of the positioning ring 42*b*. In such a manner, when the buffer unit 4*b* is pressed by the filter element, the buffer unit 4*b* is contracted and elastically deformed, to form a buffering force.

Figure 9:
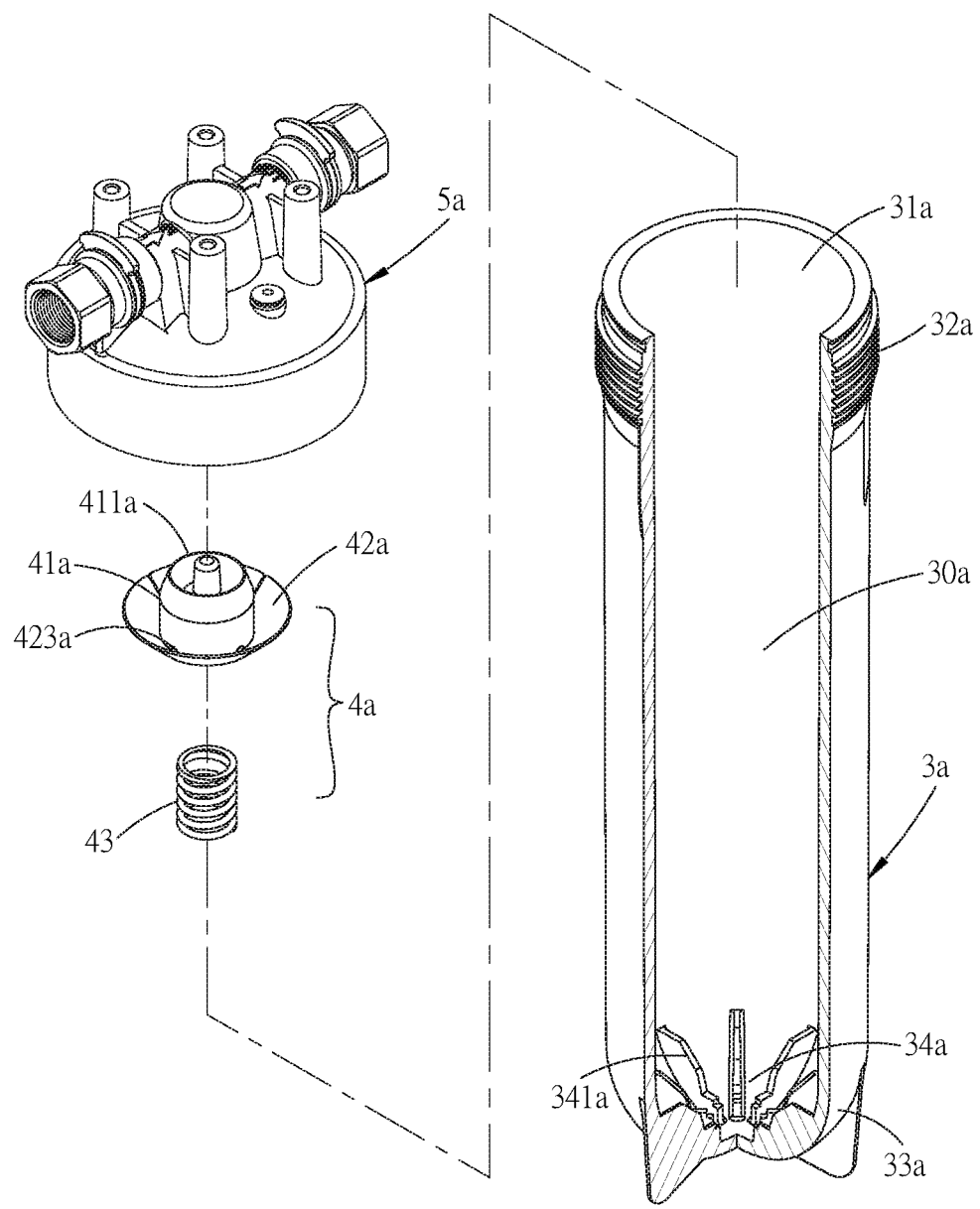
FIG. 9 is an exploded perspective view of a water purifier structure in accordance with a further preferred embodiment of the present invention.
Figure 10:
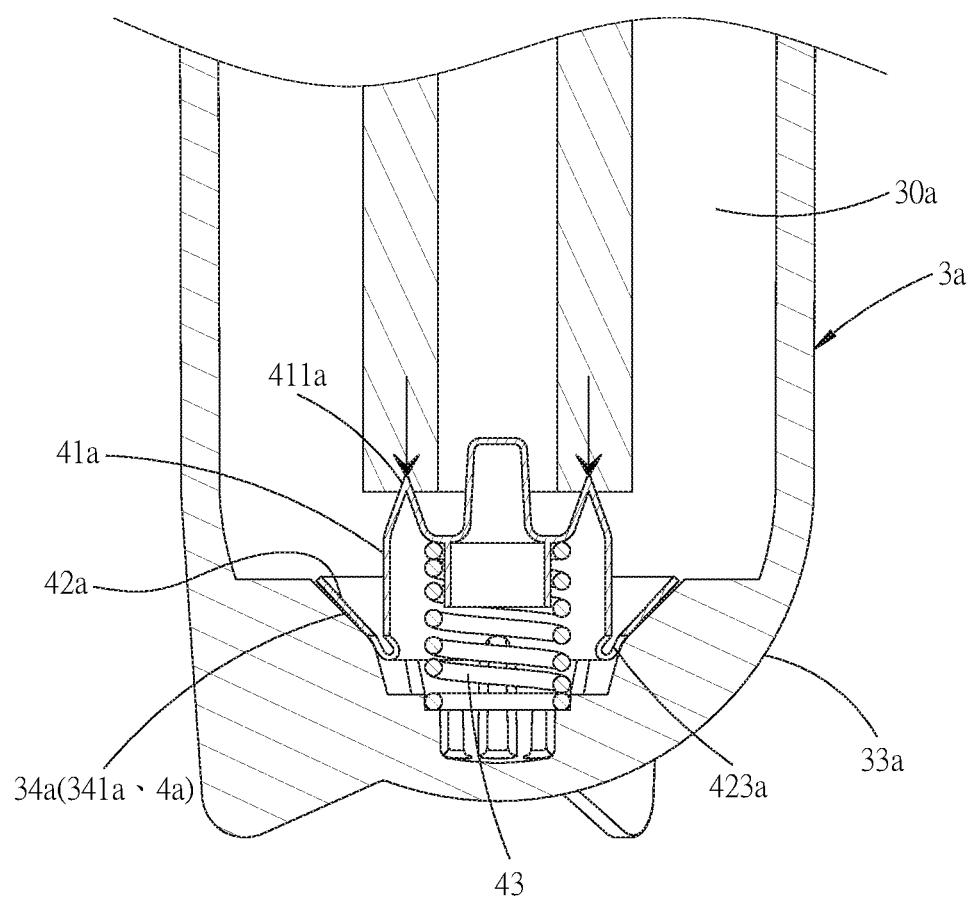
FIG. 10 is a partial cross-sectional assembly view of the water purifier structure as shown in FIG. 9.
Figure 11:
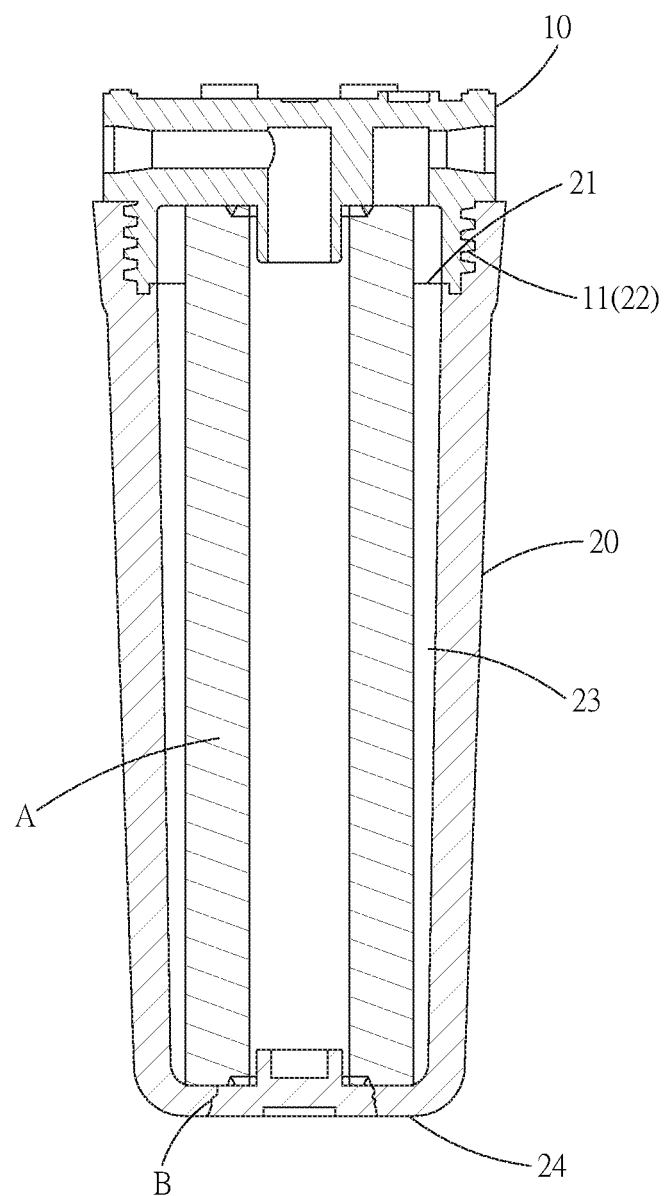
FIG. 11 is a cross-sectional view of a conventional water purifier structure in accordance with the prior art.

Referring to FIGS. 9 and 10, the housing 3*a* has an interior provided with a first receiving section 30*a* and has a top provided with an opening 31*a* connected to the first receiving section 30*a*. The housing 3*a* has a bottom 33*a* provided with a second receiving section 34*a* connected to the first receiving section 30*a*. The second receiving section 34*a* of the housing 3*a* is provided with a retaining (or securing or fastening or locking) portion 341*a*. The retaining portion 341*a* of the housing 3*a* includes a plurality of conical ribs arranged longitudinally and annularly. The cap unit 5*a* is mounted on the first connecting portion 32*a* of the housing 3*a*. The cushioning member 41*a* and the positioning ring 42*a* of the buffer unit 4*a* are formed integrally. The cushioning member 41*a* has an upper end provided with a push portion 411*a*. The positioning ring 42*a* has a conical shape and extends outward from a bottom of the cushioning member 41a. The cushioning member 41a and the positioning ring 42a have a connection formed with a plurality of elastic plates 423a. The buffer unit 4a further includes an elastic member 43 mounted in the second receiving section 34a of the housing 3a and biased between a bottom of the second receiving section 34a and the cushioning member 41a. In such a manner, the elastic plates 423a provide an elastic force so that when the buffer unit 4a is compressed, the cushioning member 41a is contracted and elastically deformed toward the second receiving section 34a of the housing 3a, to form a buffering force. In addition, the elastic member 43 provides a restoring force to the buffer unit 4a.

Accordingly, when the buffer unit is pressed by the filter element, the buffer unit is contracted and elastically deformed to form a buffering force to the filter element, such that the filter element will not directly press the bottom of the housing, thereby preventing the bottom of the housing from producing a crack, so as to enhance the lifetime of the housing. In addition, the housing is used to receive filter elements with different length. Further, the two buckles 52 are snapped into and locked in the snap-fit hole 503 to lock the two quick connectors 51 respectively, such that the two quick connectors 51 are connected with the cover 50 quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A water purifier structure comprising:
a container assembly; and
a buffer unit mounted in the container assembly;
wherein:
the container assembly includes a housing and a cap unit mounted on the housing;
the housing has a first connecting portion;
the housing has an interior provided with a first chamber;
a filter element is mounted in the first chamber of the housing and presses the buffer unit;
the housing has a top provided with an opening;
the housing has a bottom provided with a second chamber;
the bottom of the housing has an arcuate recessed shape;
the second chamber of the housing is provided with a retainer;
the cap unit has a second connecting portion detachably connected with the first connecting portion of the housing;
the buffer unit is mounted in the second chamber of the housing;
the buffer unit includes a positioning ring secured in the retainer of the housing, and a cushioning member elastically mounted in the positioning ring;
the cushioning member has an upper end provided with a push portion and a lower end provided with a pressing portion;
the pressing portion of the cushioning member has a conical shape;
the positioning ring has an interior provided with a hollow passage;
the positioning ring has a plurality of elastic plates spaced from each other;
the positioning ring has an outer face provided with a snap-fit portion secured on the retainer of the housing;
the pressing portion of the cushioning member is received in the hollow passage of the positioning ring and has an outer face elastically pressed by the plurality of elastic plates of the positioning ring;
the push portion of the cushioning member protrudes outward from a top of the positioning ring;
the cushioning member is elastically movable in the positioning ring upward and downward; and
when the cushioning member is compressed by an external force, the cushioning member is contracted and elastically deformed toward the second chamber of the housing, to form a buffering force.

2. The water purifier structure of claim 1, wherein the snap-fit portion of the positioning ring has a U-shaped cross-sectional profile with an annular groove secured on the retainer of the housing.

3. The water purifier structure of claim 1, wherein the filter element is fully received in and surrounded by the first chamber of the housing.

4. The water purifier structure of claim 1, wherein the push portion of the cushioning member of the buffer unit is pressed by a bottom of the filter element.

5. The water purifier structure of claim 1, wherein the push portion and the pressing portion of the cushioning member of the buffer unit construct a one-piece structure.

6. The water purifier structure of claim 1, wherein the filter element presses the push portion of the cushioning member of the buffer unit toward the second chamber of the housing.

7. The water purifier structure of claim 1, wherein the pressing portion of the cushioning member has a dimension more than that of the push portion, and the push portion of the cushioning member is movable freely in the hollow passage of the positioning ring.

8. The water purifier structure of claim 1, wherein the positioning ring of the buffer unit surrounds the cushioning member, and the plurality of elastic plates of the positioning ring are pressed and expanded outward by the pressing portion of the cushioning member.

9. The water purifier structure of claim 1, wherein the push portion of the cushioning member is partially received in and partially protrudes from the positioning ring.

10. The water purifier structure of claim 1, wherein the plurality of elastic plates are formed in the positioning ring.

11. The water purifier structure of claim 1, wherein the positioning ring of the buffer unit is fully received in the second chamber of the housing and is located at a height less than that of the push portion of the cushioning member.

12. The water purifier structure of claim 1, wherein the plurality of elastic plates of the positioning ring surround the pressing portion of the cushioning member.

* * * * *